(12) United States Patent
Masuda et al.

(10) Patent No.: US 6,497,456 B1
(45) Date of Patent: Dec. 24, 2002

(54) SEAT BELT PRETENSIONER DEVICE (75) Inventors: Kou Masuda, Yokohama (JP);
Hiroyoshi Yamaguchi, Yokohama (JP);
Eiji Shimizu, Yokohama (JP); Takeshi Ito, Yokohama (JP); Tomoharu Ooi, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 09/554,281

(22) PCT Filed: Sep. 9, 1998

(86) PCT No.: PCT/JP98/04043
§ 371 (c)(1),
(2), (4) Date: May 9, 2000

(87) PCT Pub. No.: WO00/13946
PCT Pub. Date: Mar. 16, 2000

(51) Int. Cl.$^7$ .............................................. B60R 22/46
(52) U.S. Cl. ..................... 297/480; 192/223.2; 280/806
(58) Field of Search ................................. 297/472, 480; 280/806, 807; 192/45, 223.2

(56) References Cited

U.S. PATENT DOCUMENTS

| | | | | |
|---|---|---|---|---|
| 3,972,561 A | * | 8/1976 | Breitschwerdt | 297/472 |
| 4,705,296 A | | 11/1987 | Andersson et al. | 280/806 |
| 4,989,705 A | * | 2/1991 | Kashio et al. | 192/45 |
| 5,485,970 A | | 1/1996 | Steffens, Jr. | 242/374 |
| 5,695,031 A | * | 12/1997 | Kurita et al. | 192/45 |
| 5,941,355 A | * | 8/1999 | Iga | 192/45 |
| 5,984,357 A | * | 11/1999 | Yasuda et al. | 297/480 |

FOREIGN PATENT DOCUMENTS

| | | |
|---|---|---|
| EP | 0 455 859 A1 | 11/1991 |
| JP | 7-309205 | 11/1995 |
| JP | 10-181529 | 7/1998 |

\* cited by examiner

*Primary Examiner*—Peter R. Crown
(74) *Attorney, Agent, or Firm*—MacPherson Kwok Chen & Heid LLP (57) ABSTRACT

In a seat belt pretensioner device, comprising a seat belt buckle which is supported in a moveable manner, a power generator for moving the buckle in a direction to increase a tension of the seat belt, and a reverse preventing device for preventing the reversal of the movement of the buckle, the reverse preventing device consists of a ball-type one-way clutch defining a plurality of chambers between an inner race and an outer race, each of said chambers narrowing in a rotational direction and receiving a ball and a spring urging the ball toward a narrower part of the corresponding chamber, and the springs are formed by bending a plurality of projections integrally formed in a peripheral part of a single disk shaped plate member into a wavy form. Thus, the multitude of springs are formed by a single member, and not only the management of component parts is simplified but also the assembly work for the one-way clutch is facilitated even when the one-way clutch is not adapted to be formed as a subassembly.

15 Claims, 14 Drawing Sheets

SEAT BELT PRETENSIONER DEVICE

TECHNICAL FIELD

The present invention relates to a pretensioner device for automatically increasing the tension of an automotive seat belt.

BACKGROUND OF THE INVENTION

An automotive seat belt is typically equipped with a seat belt for restraining the vehicle occupant with the aim of preventing the occupant from being thrown forward in case of a vehicle crash or the like. Oftentimes, the seat belt is provided with an emergency locking retractor (ELR) device for locking the winding shaft for the seat belt only in case of an abrupt stop or a vehicle crash without excessively restraining the vehicle occupant in normal situations. Such an ELR device is required to be capable of detecting a deceleration exceeding a prescribed level, and locking up the winding shaft in an extremely short time to prevent the seat belt from being paid out any further.

Simply locking up the winding shaft cannot prevent the seat belt from being paid out by an amount created by tightening the seat belt wound on the winding shaft. In view of this problem, proposals have been made (for instance, in the U.S. Pat. No. 4,705,296) to provide a pretensioner device which can increase the restraining capability of the seat belt by rapidly pulling the buckle which is attached to the seat belt in the direction to increase the tension of the seat belt. Also, to prevent the buckle which has been pulled in this manner from being pulled back by the tension of the seat belt, it has been proposed to provide a means for preventing such a reversing movement, such as a ratchet device or one-way clutch, in addition to the ELR device.

A reverse preventing means may be formed by a ratchet device or one-way clutch, and the one using a one-way clutch in the form of a ball-type one-way clutch was disclosed in Japanese patent application No. 8-350702 (kokai publication No. 10-181529) filed by the common assignee.

In this ball-type one-way clutch, a plurality of small chambers are defined between an inner race and an outer race each of which gets progressively narrower in a circumferential direction and receives a ball therein. Each ball is urged by a spring toward a narrower part of the chamber.

Typically, the springs consist of compression coil springs. Because the springs and balls are needed as many as the number of the chambers, a large number of components are required, and this complicates the management of component parts. In particular, when the inner race and/or the outer race is integral with other parts of the pretensioner device, and the reversing preventing device cannot be therefore formed as a subassembly, the assembly work tends to be complicated because of the need to install a ball and spring in each of a large number of small chambers.

BRIEF SUMMARY OF THE INVENTION

The present invention was made in view of such problems of the prior art, and its primary object is to provide a seat belt pretensioner device which requires a small number of component parts thereby simplifying the management of component parts and facilitating the assembly work.

According to the present invention, such an object can be accomplished by providing a seat belt pretensioner device, comprising a seat belt buckle which is supported in a moveable manner, a power generator for moving the buckle in a direction to increase a tension of the seat belt, and a reverse preventing device for preventing the reversal of the movement of the buckle, characterized in that: the reverse preventing device consists of a ball-type one-way clutch defining a plurality of chambers between an inner race and an outer race, each of said chambers narrowing in a rotational direction and receiving a ball and a spring urging the ball toward a narrower part of the corresponding chamber; and the springs are formed by bending a plurality of projections integrally formed in a peripheral part of a single disk shaped plate member into a wavy form.

Thereby, the multiplicity of springs can be formed with a single member, and properly positioned simultaneously.

DETAILED DESCRIPTION OF THE PREFERRED EMBODIMENTS

Now the present invention is described in the following with reference to the appended drawings.

Figure 1:
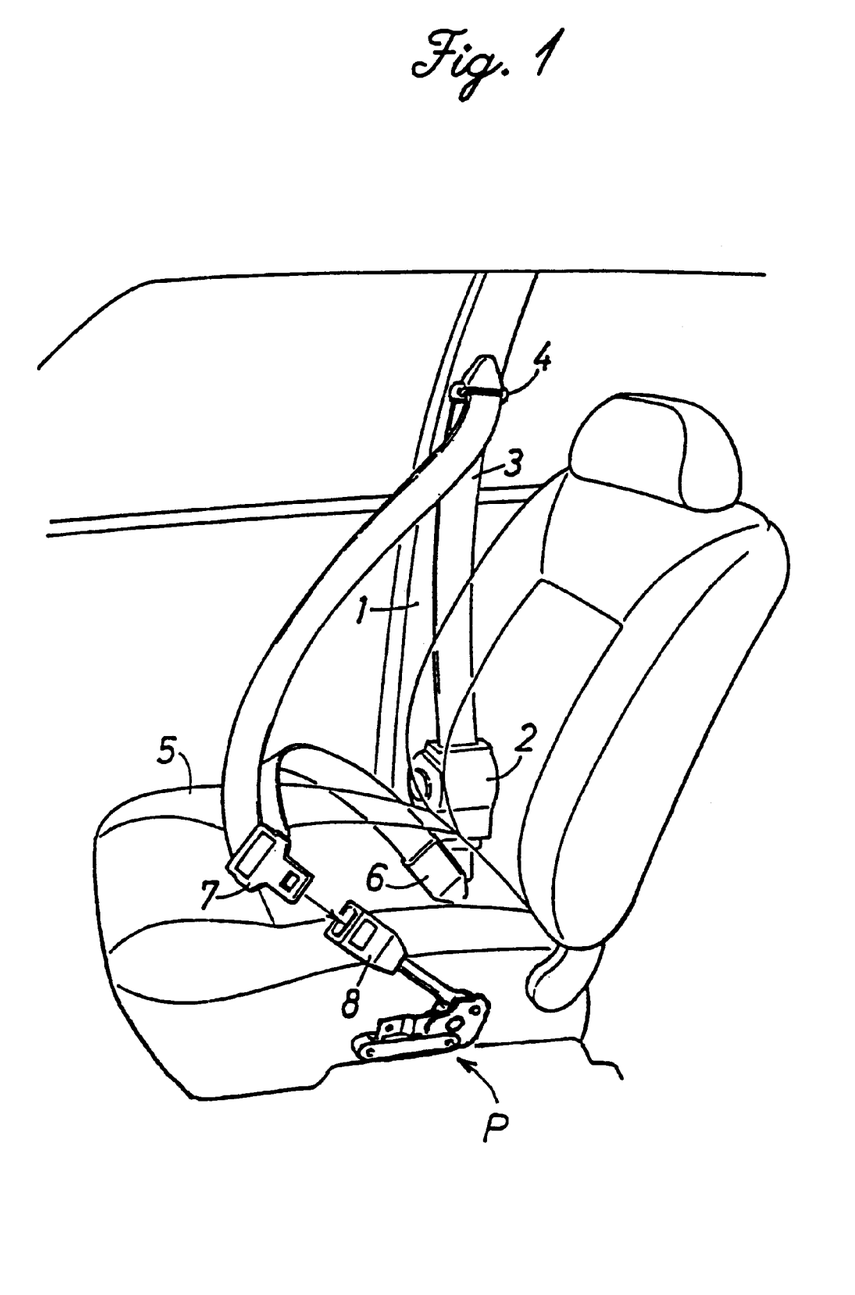
FIG. 1 is a perspective view of an automotive vehicle seat to which the present invention is applied.

FIG. 1 is a perspective view of an automotive vehicle seat to which the present invention is applied. Referring to FIG. 1, a seat belt 3 extends upward from an ELR device 2 fixedly attached to a lower part of a center pillar 1 in the passenger compartment of the vehicle, and after passing through a through ring 4 mounted to an upper part of the center pillar 1, extends downward. The free end 6 of the seat belt 3 is fixedly attached to a rear portion of one side of the seat 5. A tongue plate 7 is fitted to a part of the seat belt 3 intermediate between the through ring 4 and the free end 6 so as to be slidable along the length of the seat belt 3. To the other side of the seat 5 remote from the point of attachment of the seat belt free end 6 is attached a buckle 8 via a pretensioner device P according to the present invention.

As a vehicle occupant in the seat 5 pulls out the seat belt 3 from the ELR device 2 and latches the tongue plate 7 into the buckle 8, the seat belt 3 is passed along the shoulder, chest and hip of the vehicle occupant.

The pretensioner device P is intended to automatically increase the tension of the seat belt 3 in case of a vehicle crash or the like, and, as illustrated in FIGS. 2 to 5, comprises a base plate 11 for fixedly securing the entire system to the corresponding side of the seat 5, an arm 12 having one end pivotally attached to the base plate 11 and another end connected to an anchor portion 8a of the buckle 8, a linear power actuator 13 serving as a power generator which is essentially fixedly secured to the base plate 11, a link member 14 having one end connected to a working end of the linear power actuator 13 and another end connected to a point of the arm 12 at a certain radial distance from the pivot center of the arm 12, and a reverse preventing device 15 for permitting the rotation of the arm 12 in only one direction.

A center shaft 16 is rotatably attached to the base plate 11 for rotation of the arm 12. The intermediate part of the arm 12 is rotatably supported by a fixed outer race 32 of the reverse preventing device 15 which is described hereinafter, and a free end of the arm 12 is provided with an annular boss 17 which rotatably supports the anchor portion 8a of the buckle 8.

Figure 5:
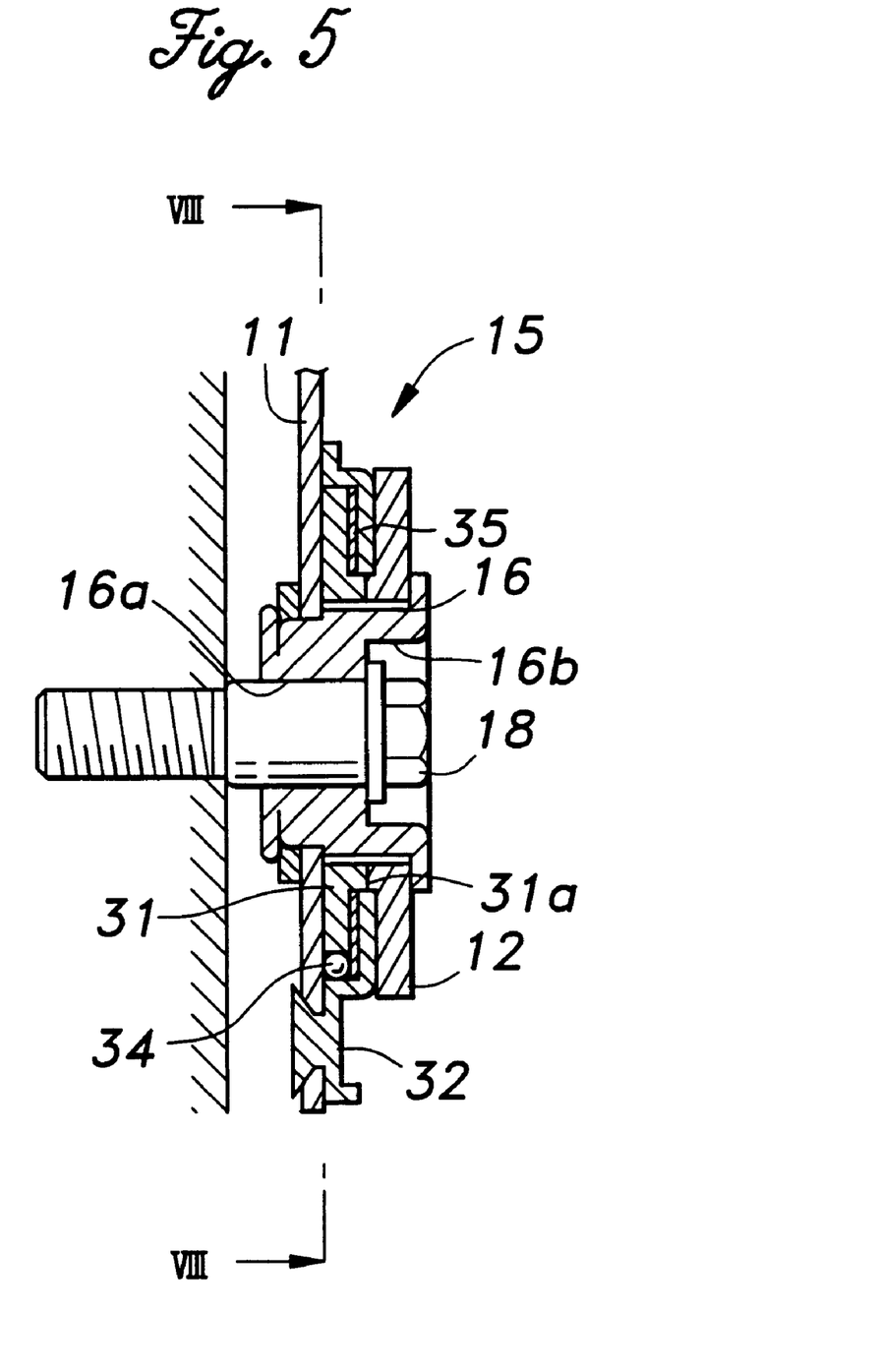
FIG. 5 is an enlarged sectional view taken along line V—V of FIG. 2.

As best shown in FIG. 5, the center shaft 16 consists of a hollow shaft, and a threaded bolt 18 is passed through an inner bore 16a of the center shaft 16 to be fastened to the seat 5 so that the pretensioner device P is fixedly attached to the seat 5. The inner bore 16a is provided with an enlarged diameter portion 16 which is adapted to receive and conceal the head of the threaded bolt 18. The threaded bolt 18 can be fastened with a socket wrench, for instance. Instead of a hexagonal-head bolt, the threaded bolt may consist of a hexagon socket head bolt. In this case, the lateral width as shown in FIG. 5 can be reduced and the overall width of the pretensioner device P can be minimized.

Figure 6:
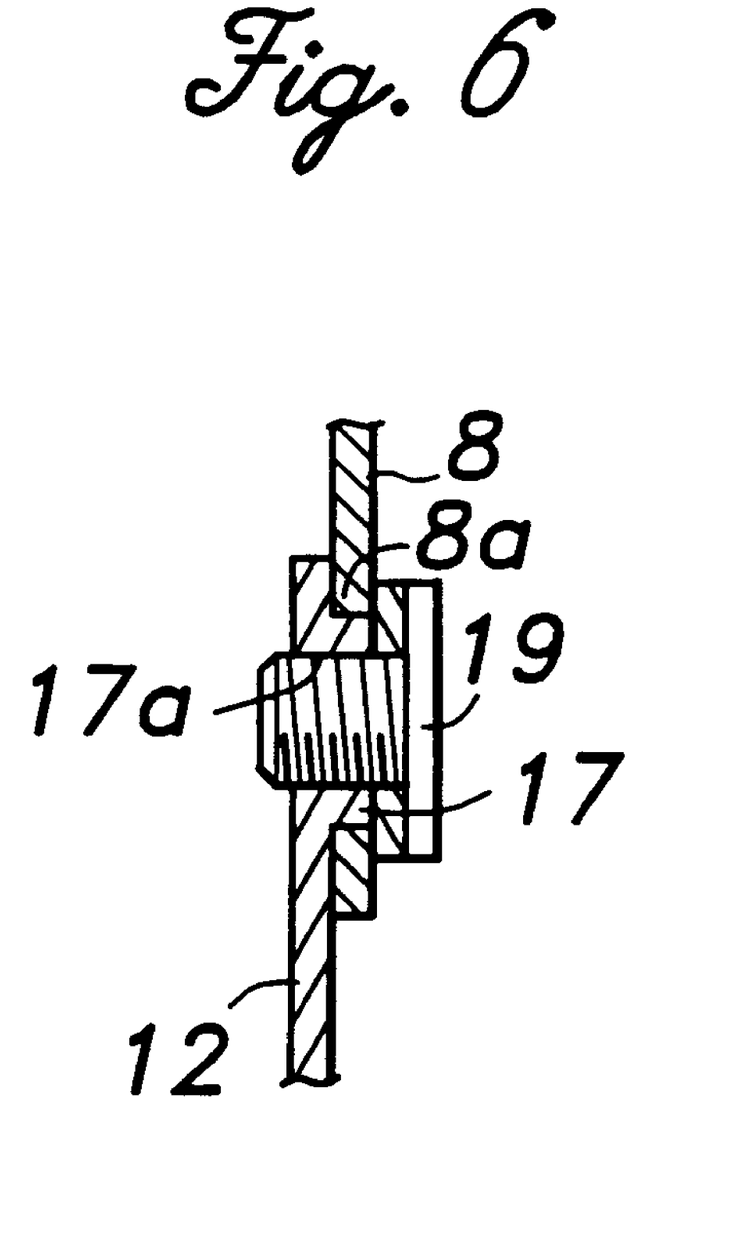
FIG. 6 is an enlarged sectional view taken along line VI—VI of FIG. 2.

Referring to FIG. 6, a screw thread is formed in the inner bore 17a of the annular boss 17 for supporting the buckle 8. The anchor portion 8a of the buckle 8 is fitted on the outer circumference of the annular boss 17a, and a threaded bolt 19 is threaded into the inner bore 17a of the annular boss 17 so that the buckle 8 is held in position. This arrangement also contributes to the reduction in the lateral width as shown in FIG. 6 or the overall width of the pretensioner device P can be minimized.

Figure 2:
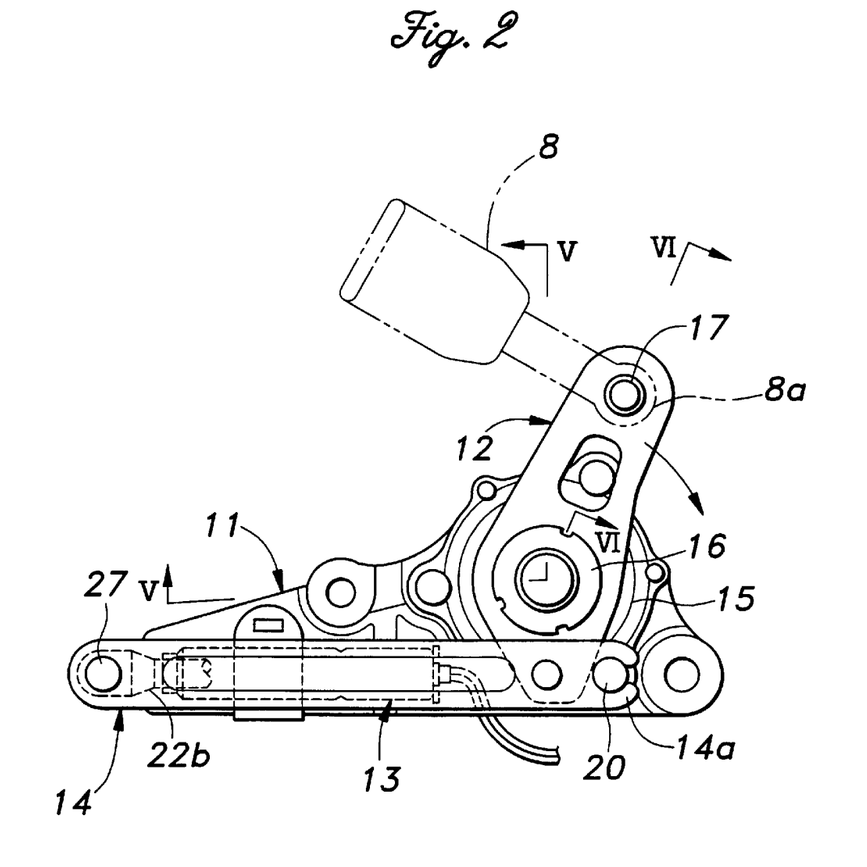
FIG. 2 is a side view of a seat belt pretensioner device embodying the present invention.
Figure 3:
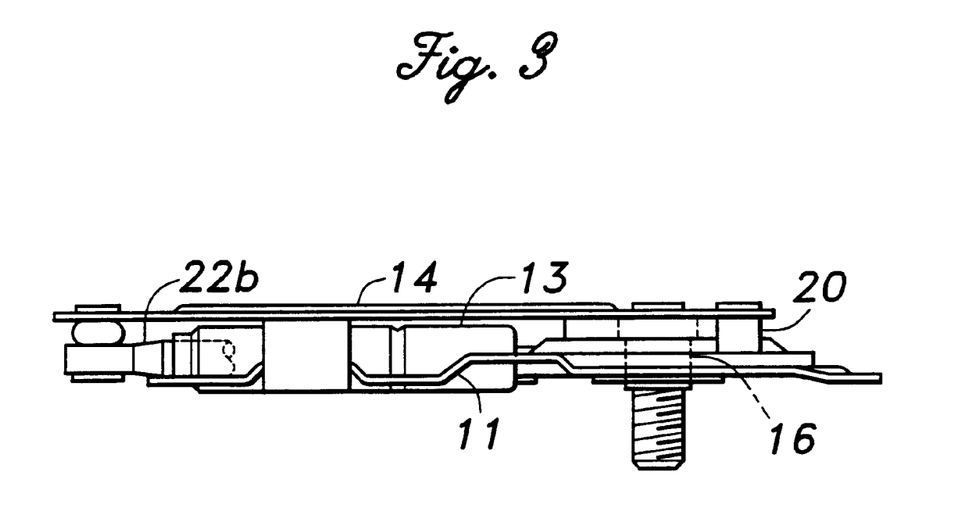
FIG. 3 is a bottom view of the seat belt pretensioner device according to the present invention.
Figure 4:
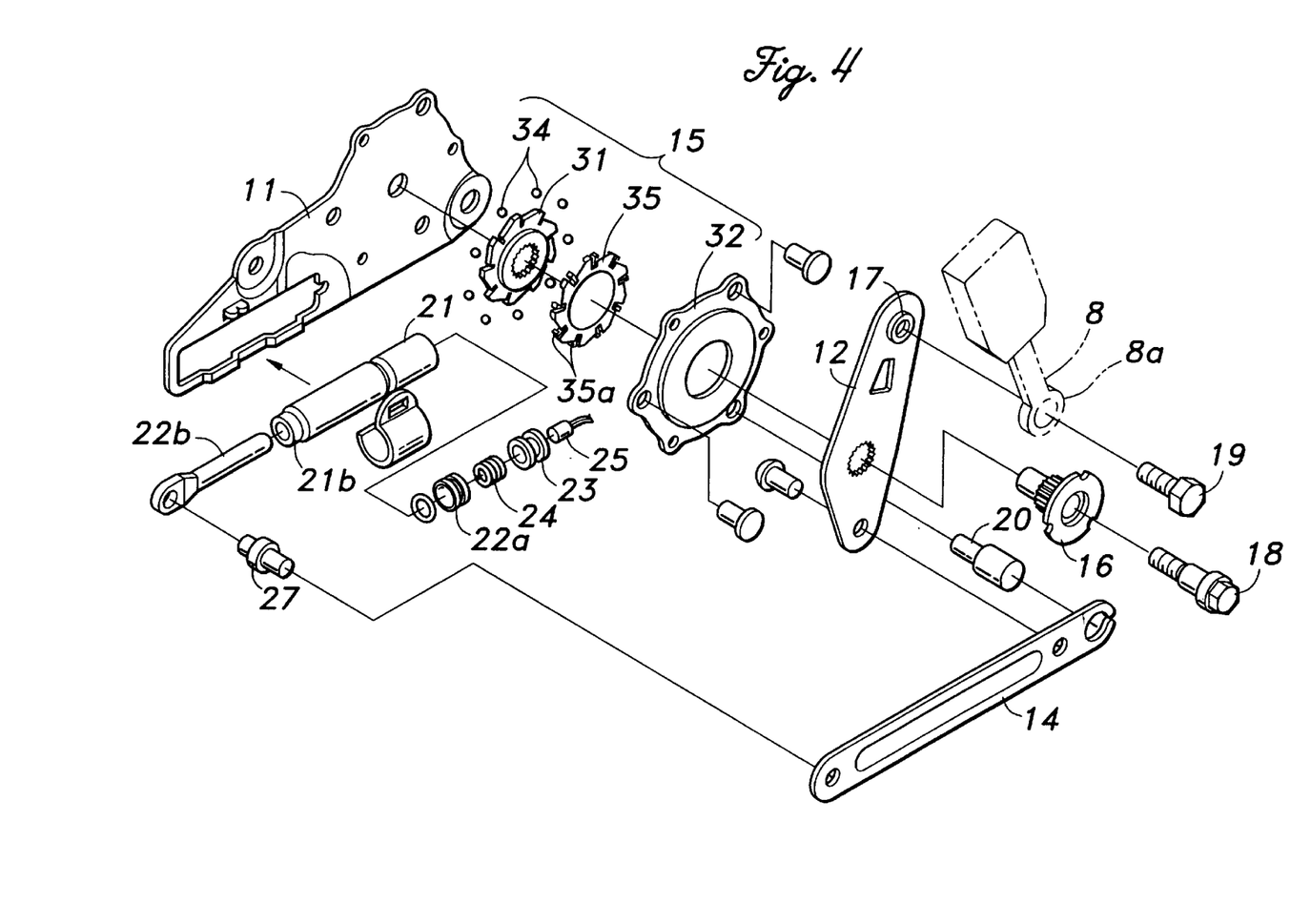
FIG. 4 is an exploded perspective view of the seat belt pretensioner device according to the present invention.

One end of the link member 14 is pivotally connected to the working end of the actuator 13 or the free end of a piston rod 22b of the actuator 13 as described more fully hereinafter, and a part adjacent to the other end of the link member 14 is pivotally connected to the arm 12. The other end of the link member 14 includes a C-shaped portion 14a which engages a pin 20 so as to form a fuse for preventing inadvertent rotation of the arm 12.

Figure 7:
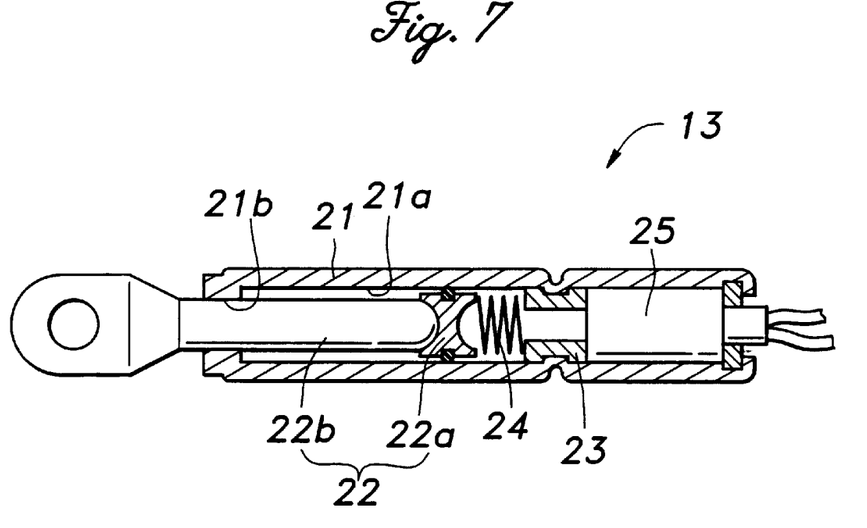
FIG. 7 is a sectional view of the power generator of the seat belt pretensioner device according to the present invention.

Referring to FIG. 7, the actuator 13 comprises a cylinder 21 fixedly attached to the base plate 11, a piston main body 22a received in the inner bore 21a of the cylinder 21 from its working end, a piston rod 22b engaging the piston main body 22a and projecting from the cylinder working end, and a gas generator 25 received in the base end of the cylinder 21. A collar 23 is fixedly secured in the cylinder 21 between the piston main body 22a and the gas generator 25 by crimping the material of the cylinder 21 onto to the collar 23.

The open end 21b of the cylinder 21 on the working end thereof is reduced in diameter by swaging or the like so as to slidably engage the outer circumferential surface of an intermediate part of the piston rod 22b. The actuator 13 is assembled as described in the following. First of all, the piston main body 22a, a compression coil spring 24, and the collar 23 are introduced into the cylinder 21 from the base end thereof, and the cylinder 21 is crimped onto the collar 23 with the collar 23 properly positioned. Then, the gas generator 25 and a retaining plate serving also as a seal are introduced into the cylinder 21 from the base end thereof, and the open base end is crimped onto the retaining plate. Thus, the assembling work is executed only from one direction, and this improves the efficiency of the assembly work.

At this point, the piston rod 22b is not installed in the actuator 13, and is handled separately. Therefore, even in case of an inadvertent operation of the gas generator 25, the piston main body 22a simply moves within the cylinder 21, and this simplifies the handling of the device. Because the piston main body 22a is light in weight, the open working end 21b of the cylinder 21 is not required to be fitted with a sturdy cap, and may be simply reduced in diameter. Therefore, the radial dimension and weight of the device can be minimized. This contributes to a small-width design of the device, and improves the freedom of layout and the ease of assembly. Furthermore, absence of a cap eliminates the need for machining work, and this also simplifies the assembly work.

This actuator 13 can be installed in the pretensioner device P as described in the following. First of all, the cylinder 21 is fixedly attached to the base plate 11. The piston rod 22b is inserted from the open working end 21b of the cylinder 21, and the free end of the piston rod 22b is connected to the link member 14 by using a pin 27.

By selecting the point of connection between the free end of the piston rod 22b and the link member 14 at a point somewhat offset in the direction of the actuation movement of the piston main body 22a, it is possible to accommodate the dimensional errors of the component parts of the pretensioner device and the positional error of the link member 14 at the time of assembly even when these errors are relatively large. In particular, because the compression coil spring 24 urges the piston main body 22a in the direction of actuation, no play is produced between adjacent component parts. The fact that the piston main body 22a is spaced from the opposing end surface of the collar 23 means an increase in the pressure receiving surface as opposed to the case where the piston main body 22a is closely in contact with the opposing end surface of the collar 23, and the magnitude of the thrust required for the operation of the device can be reduced. It means a reduced requirement for mechanical strength or a reduced wall thickness of the cylinder, and this also contributes to a light weight design of the device.

Figure 8:
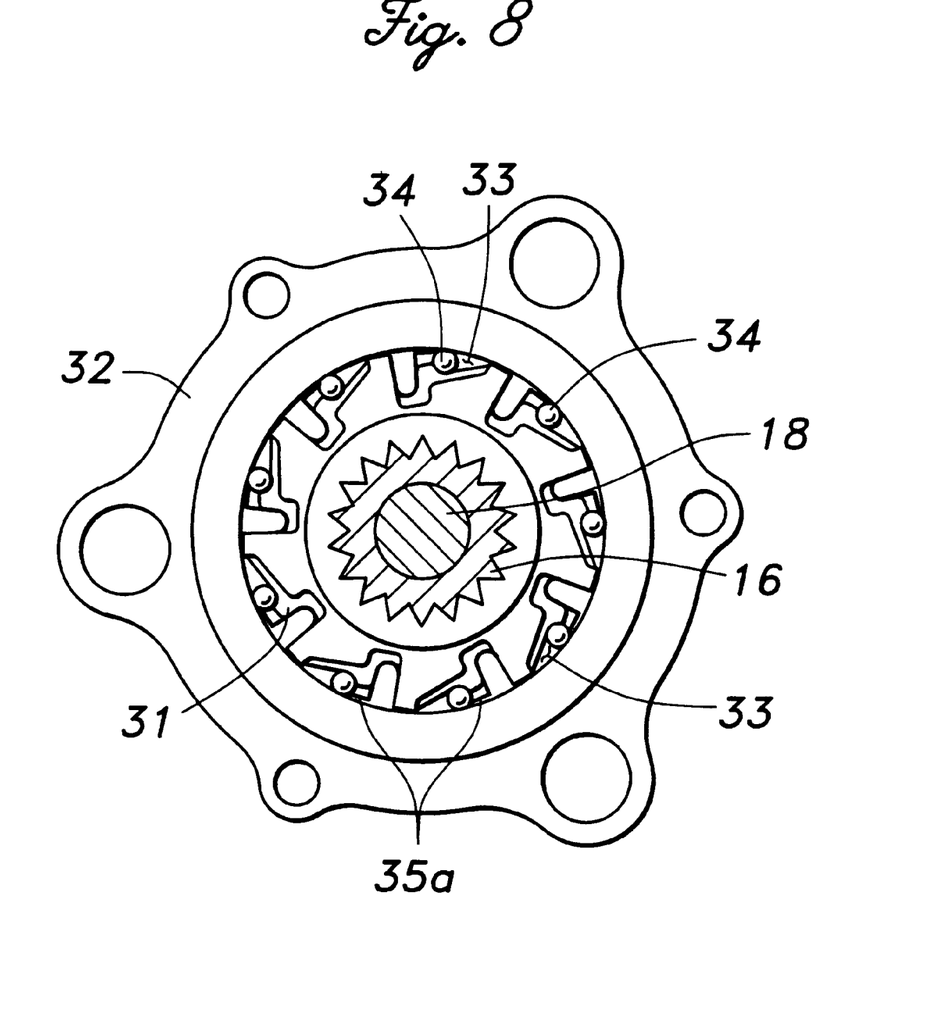
FIG. 8 is a sectional view taken along line VIII—VIII of FIG. 5 showing the structure of the reverse preventing device of the seat belt pretensioner device according to the present invention.

As shown in FIGS. 4, 5 and 8, the reverse preventing device 15 consists of a ball-type one-way clutch comprising an inner race 31 which is held rotationally fast with the center shaft 16 or the arm 12, a fixed outer race 32 integrally attached to the base plate 11 so as to define a plurality of chambers 33 in cooperation with the inner race 31, each chamber narrowing in the circumferential direction, and balls 34 received in the corresponding chambers 33. Each of the balls 34 is urged toward the narrower end of the corresponding chamber 33 by a corresponding one of a plurality of spring portions 35a formed in a spring plate 35 as described hereinafter.

Figure 9A:
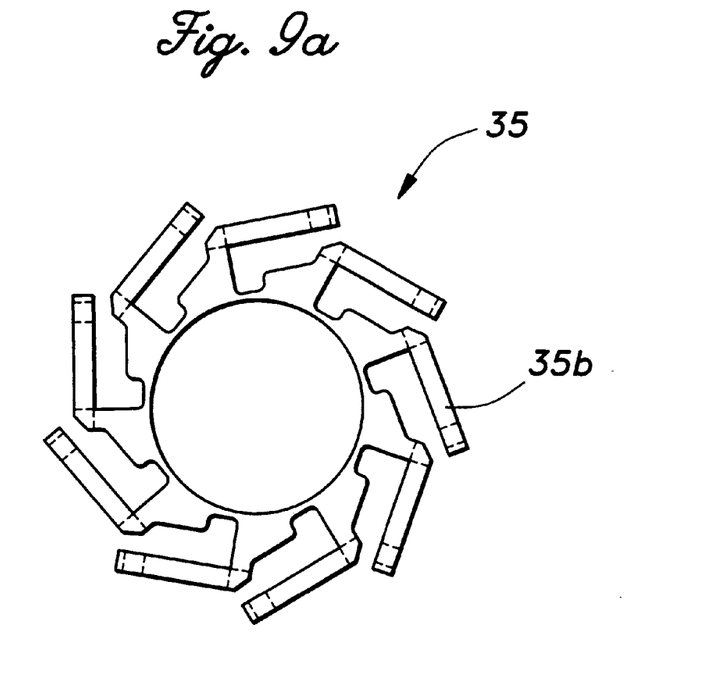
FIG. 9 is a diagram showing the steps of forming the spring plate of the seat belt pretensioner device according to the present invention.
Figure 9B:
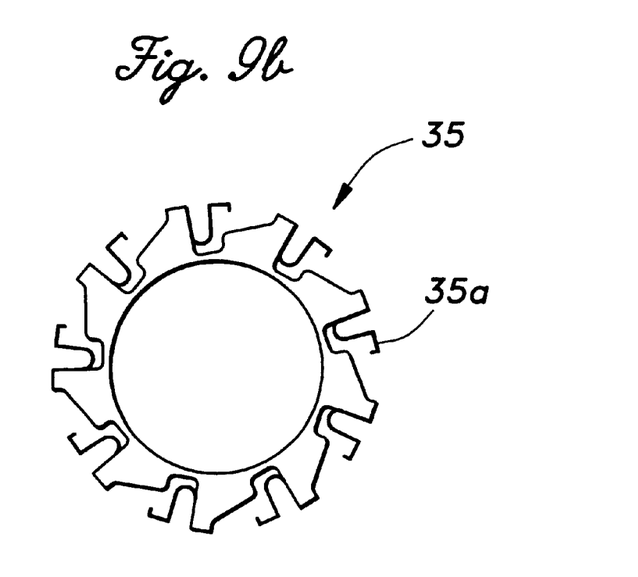

Referring to FIG. 9, the spring plate 35 made of a single plate member which is substantially shaped as a disk, and a plurality of projections 35b are formed along the periphery thereof. Each of the spring portions 35a is formed by bending one of the projections 35b by 90 degrees along the dotted lines, and bending it into a wavy form.

Referring to FIG. 5, the outer race 32 covers the chambers 33, and, at its inner periphery, slidably engages an annular projection 31a which is coaxially formed with the inner race 31. As a result, the dimensional precision of the chambers 33 can be ensured, and the stable action of the balls can be maintained at all times for a reliable operation of the system.

Now the mode of operation of this embodiment is described in the following. First of all, when an impact is detected by a deceleration sensor (not shown in the drawings), the propellant of the gas generator 25 is ignited, and the resulting pressure of the combustion gas pushes out the piston assembly 22. The thrust of the piston assembly 22 is transmitted to the arm 12 via the link member 14 for the rotational movement of the arm 12 while the C-shaped portion 14a on the other end of the link member 14 is deformed so as to permit the rotation of the arm 12. As the arm 12 rotates, the buckle 8 is pulled inward (see FIG. 10) so as to apply a tension to the seat belt 3 and increase the restraint on the vehicle occupant. At this point, even after the combustion gas has ceased to be produced, because the reverse preventing device 15 prevents the reverse rotation of the arm 12, the slackening of the seat belt 3 can be avoided.

Figure 10:
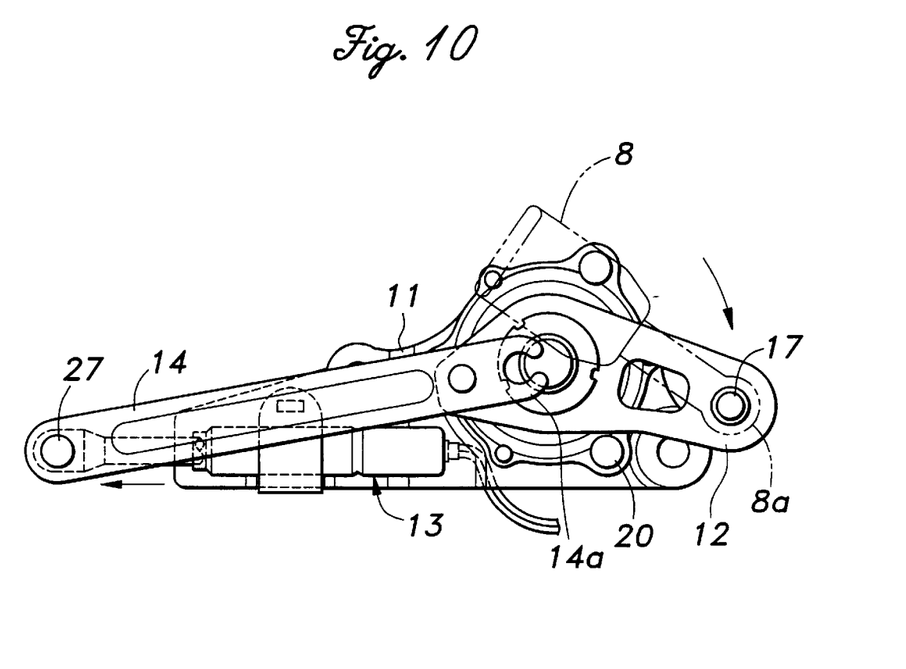
FIG. 10 is a diagram showing the mode of operation of the device of the present invention.

As shown in FIGS. 2 and 10, the pin 20 engaging the C-shaped portion 14a of the other end of the link member 14 abuts the base end of the arm 12 at rest and abuts a part of the arm 12 adjacent to the free end thereof when the buckle 8 is pulled in (FIG. 10) so that the pin also serves as a means for defining the rotational range of the arm 12.

Figure 11:
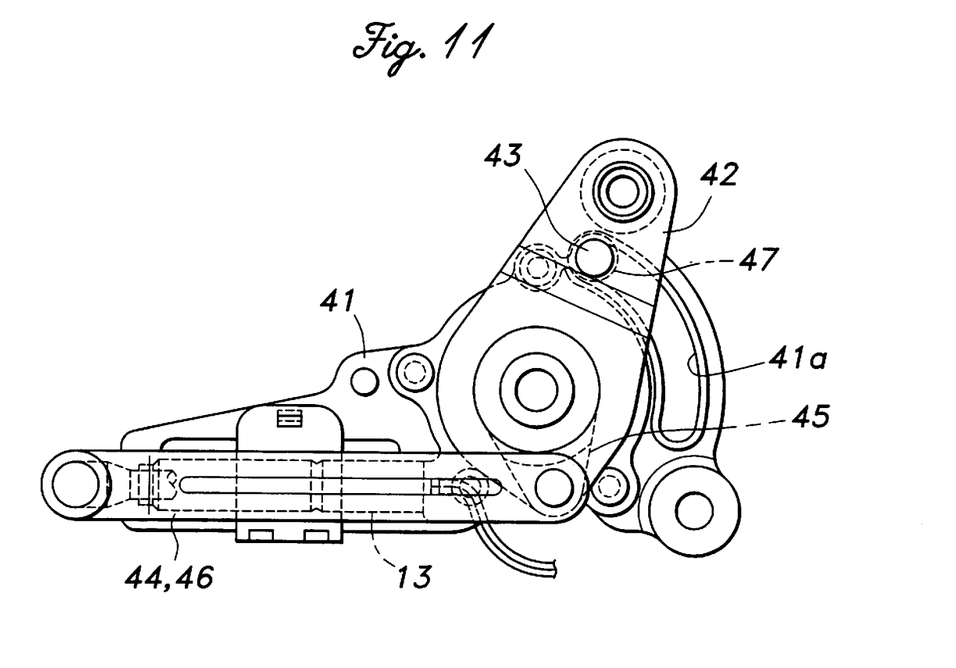
FIG. 11 is a view similar to FIG. 2 showing a second embodiment of the seat belt pretensioner device according to the present invention.
Figure 12:
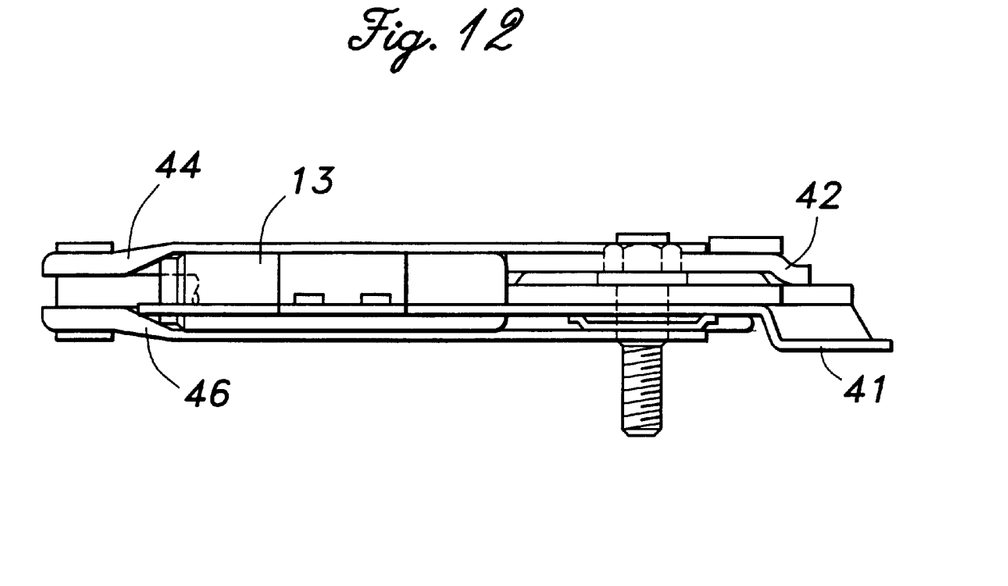
FIG. 12 is a view similar to FIG. 3 showing the second embodiment of the seat belt pretensioner device according to the present invention.
Figure 13:
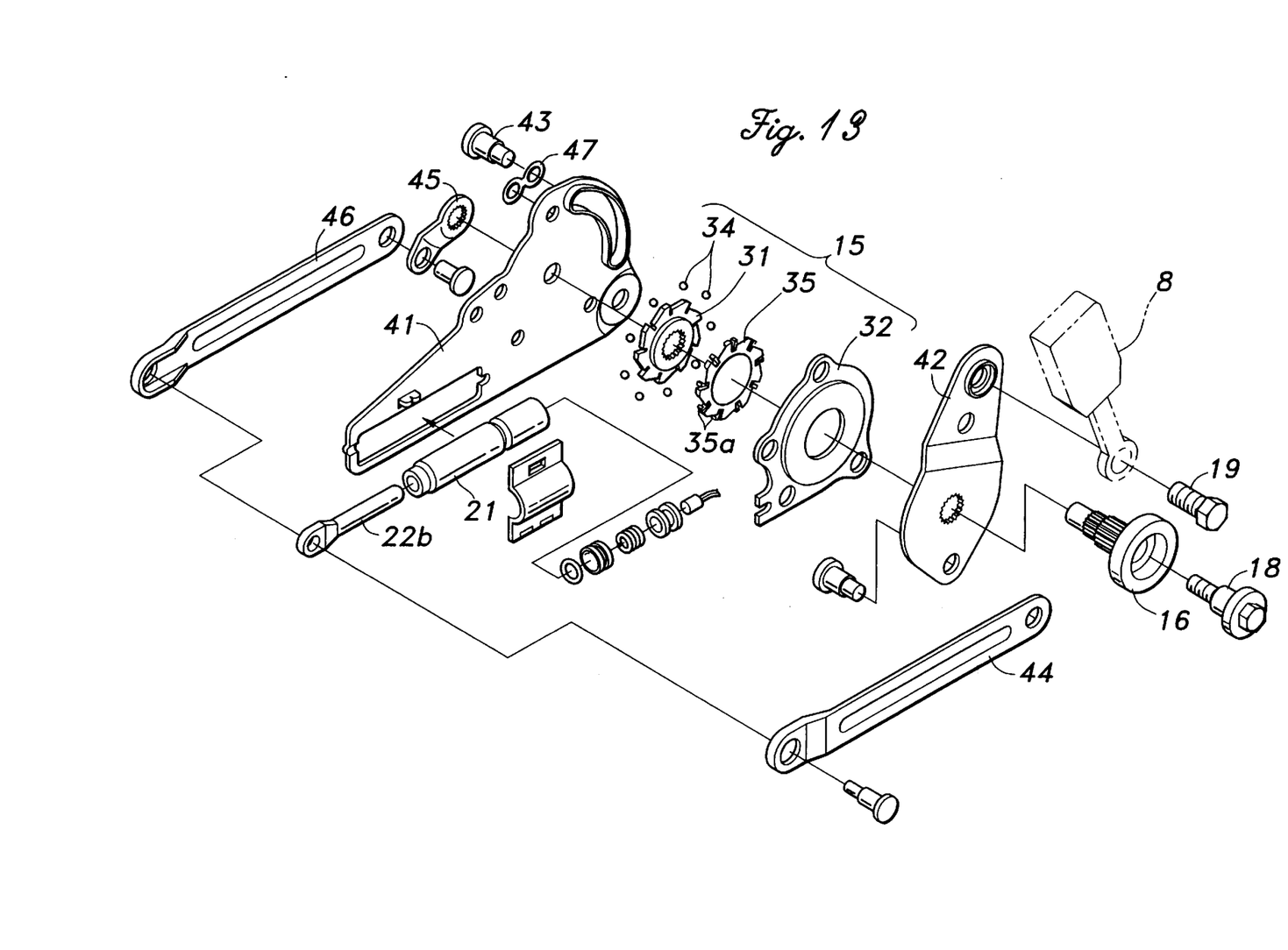
FIG. 13 is a view similar to FIG. 4 showing the second embodiment of the seat belt pretensioner device according to the present invention.

FIGS. 11 to 13 are views similar to FIGS. 2 to 4 showing another embodiment of the seat belt pretensioner device according to the present invention, and the parts corresponding to those shown in FIG. 2 are denoted with like numerals without describing them again. In this embodiment, the range of angular movement of the arm 42 is defined by receiving a pin 43 projecting from the arm 42 in an arcuate slot 41a formed in the base plate 41.

In addition to a link member 44 which has one end pivotally connected to the working end of the actuator 13 and another end pivotally connected to the arm 12, another link member 46 is placed on the other side of the base plate 41 remote from the aforementioned link member 44. The second link member 45 has one end pivotally connected to the working end of the actuator 13 and another end pivotally connected to a sub arm 45 which is integral with the arm 42.

Additionally, a fuse member 47 is provided with the pin 43 and the outer race 32. One end of the fuse member 47 is fitted on a projection (not shown in the drawing) integrally projecting from the outer race 32, and is secured in position by crimping the head of this pin. Therefore, in this embodiment, the pin 43 engaging the fuse member additionally serves as a pin for defining the range of angular movement of the arm 42.

Figure 14:
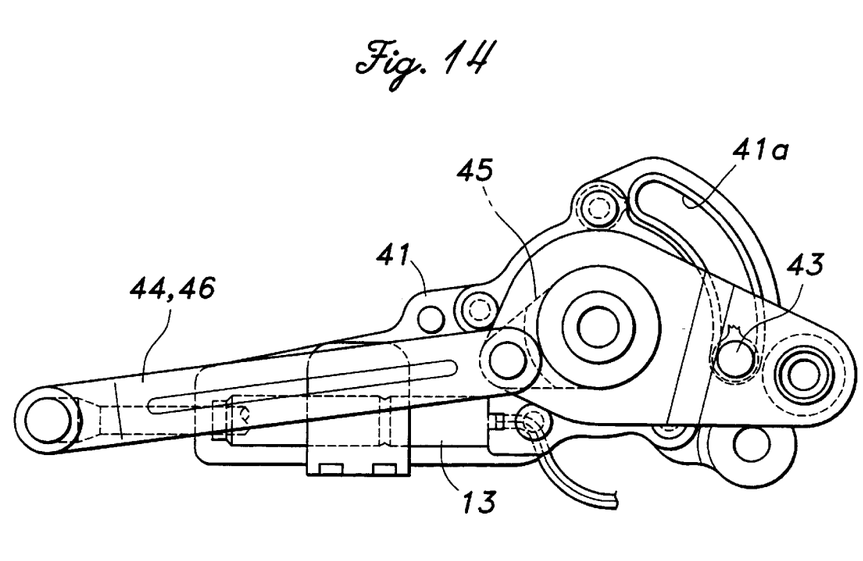
FIG. 14 is a diagram similar to FIG. 10 showing the mode of operation of the device of the present invention.

The mode of operation of this embodiment is similar to that of the previous embodiment except for that the fuse member 47 ruptures upon rotation of the arm 42, and the rotation of the arm 42 is restricted by the pin 43 engaging an end of the arcuate slot 41a (FIG. 14).

INDUSTRIAL APPLICABILITY

Thus, according to the present invention, the springs for urging the balls of the ball-type one-way clutch are formed by bending projections in a wavy form, the projections being formed around a disk-shaped plate member as integral parts thereof. Thus, the multitude of springs are formed by a single member, and not only the management of component parts is simplified but also the assembly work for the one-way clutch is facilitated even when the one-way clutch is not adapted to be formed as a subassembly.

By fitting the outer race onto an annular projection formed coaxially with the inner race for slidable engagement over the entire inner circumferential of the outer race, the dimensional precision of the chambers for receiving the balls of the one-way clutch can be improved, and this contributes to the improvement of operation reliability.

Because the force which is normally applied to the buckle is smaller than the drive force of the power generator, the provision of the fuse member prevents inadvertent movement of the buckle. This arrangement, which is substantially free from seizure, is also more reliable than the arrangement which prohibits movement of the buckle by using a latch and releasing it either mechanically or electrically.

It is also possible to directly form an annular boss having a screw thread formed therein in the free end of the arm member which is in turn rotatably supported by the base member, and support the buckle with this boss. Thereby, as compared with the arrangement using a threaded bolt and nut, the number of component parts can be reduced, and the width of the device can be minimized.

Furthermore, because the pin engaging the fuse member may additionally serve as a pin for defining the range of angular motion of the arm, not only the number of component parts can be reduced but also the assembly work can be simplified by virtue of the fact that the positioning of the arm can be performed simply with respect to the single pin.

What is claimed is:

1. A seat belt pretensioner device, comprising a seat belt buckle which is supported in a moveable manner, a power generator for moving the buckle in a direction to increase a tension of the seat belt, and a reverse preventing device for preventing the reversal of the movement of the buckle, characterized in that:

the reverse preventing device consists of a ball-type one-way clutch defining a plurality of chambers between an inner race an outer race, each of said chambers narrowing in a rotational direction and receiving a ball and a spring urging the ball toward a narrower part of the corresponding chamber; and the springs are formed by bending an outer end of a plurality of projections integrally formed in a peripheral part of a single disk shaped plate member into a curved form which contacts an associated ball.

2. A seat belt pretensioner device according to claim 1, wherein the inner race is provided with a concentric annular projection, and the outer race slidably engages the annular projection over an entire circumference thereof and covers the chambers.

3. A seat belt pretensioner device according to claim 1, further comprising:

a base member;

an arm rotatably supported by the base member, one end of the arm coupled to the seat belt buckle;

a link member having one end coupled to the power generator and another end coupled to the arm for rotating the arm, wherein the link member includes a deformable portion coupled to the base member, the deformable portion permitting a movement of the buckle in the direction to increase the tension of the seat belt by deformation of the deformable portion under a force greater than a prescribed level.

4. A seat belt pretensioner device according to claim 3, further comprising a pin coupled to the base member, wherein the pin serves as a member for defining a rotational range of the movement of the arm.

5. A seat belt pretensioner device according to claim 1, further comprising an arm rotatably supported by a base member, the arm including an annular projection defining a threaded bore therein and formed in a free end of the arm, the annular projection holding the buckle in position via a threaded bolt threaded into the threaded bore and rotatably supporting the buckle, so that the arm can be moved by rotating the arm with the power generator.

6. A seat belt pretensioner device, comprising a seat belt buckle which is supported in a moveable manner, a power generator for moving the buckle in a direction to increase a tension of the seat belt, and a reverse preventing device for preventing the reversal of the movement of the buckle, wherein the reverse preventing device comprises:

an inner race;

an outer race defining a plurality of chambers that get progressively narrower in a rotational direction in cooperation with said inner race and fixedly attached to a base member so as to cover said chambers from two sides and retain said inner race in a rotatable manner, a plurality of balls each received in a corresponding one of said chambers, and a spring member for urging each of said balls toward a narrow end of the corresponding chamber;

the inner race being provided with an annular projection which passes out of a central opening of said outer race from a side of said outer race facing away from the base member; and further wherein the pretensioner comprises:

a center shaft connected to the inner race for rotation therewith, and an arm connected to the center shaft for rotation therewith from a side facing away from the base member outside the outer race and connected to the buckle, the center shaft integrally joining the base member, the inner race and the arm.

7. A seat belt pretensioner device according to claim 6, wherein the inner opening of the outer race slidably engages the annular projection over an entire circumference thereof.

8. A seat belt pretensioner device according to claim 6, further comprising a member having a controlled rupture/deformation property for permitting a movement of the buckle in the direction to increase the tension of the seat belt by rupturing or deforming under a force greater than a prescribed level.

9. A seat belt pretensioner device according to claim 8, wherein the arm is connected to the central shaft at an intermediate part thereof, and the member having a controlled rupture/deformation property engages a pin rigidly connected to base member, the pin additionally serving as a member for defining a rotational range of the movement of the arm.

10. A seat belt pretensioner device according to claim 9, wherein the member having a controlled rupture/deformation property comprises a link member joining the power generator to the arm, and the link member is provided with an opening for receiving the pin.

11. A seat belt pretensioner device according to claim 10, wherein the pin is additionally adapted to define a rotational range of the arm.

12. A seat belt pretensioner device according to claim 6, wherein the arm includes an annular boss having a threaded bore therein and formed in a free end of the arm, the annular boss holding the buckle in position via a threaded bolt threaded into the threaded bore and rotatably supporting the buckle, so that the arm can be moved by rotating the arm with the power generator.

13. A seat belt pretensioner device according to claim 6, wherein the spring member is formed by a disk-shaped sheet spring having a plurality of projections extending from an outer periphery of the sheet spring, the projections being bent so as to form the corresponding spring members.

14. A seat belt pretensioner device according to claim 6, wherein the center shaft comprises a hollow shaft, and the pretensioner device is fixedly attached to a seat by passing a threaded bolt through an inner bore of the hollow shaft and fastening the threaded bolt to the seat.

15. A seat belt pretensioner device according to claim 6, wherein the center shaft is connected to the inner race and the arm by means of serrations.

* * * * *